Sept. 20, 1966 T. K. BOUDREAU ETAL 3,274,444

SIGNAL RESPONSIVE APPARATUS

Filed April 17, 1963 4 Sheets-Sheet 1

INVENTORS
THOMAS K. BOUDREAU
ALBERT Z. KASZYNSKI
BY Marvin Jacobson
ATTORNEY

United States Patent Office 3,274,444
Patented Sept. 20, 1966

3,274,444
SIGNAL RESPONSIVE APPARATUS

Thomas K. Boudreau, New Brighton, and Albert Z. Kaszynski, St. Paul, Minn., assignors to Sperry Rand Corporation, New York, N.Y., a corporation of Delaware Filed Apr. 17, 1963, Ser. No. 273,632
15 Claims. (Cl. 317—9)

This invention relates generally to electronic circuits for monitoring the level of D.C. energy sources which provide the power for an electronic device and for initiating operations in the electronic device of a protective nature if the energy levels exceed predetermined limits.

Since this invention has been particularly beneficial in association with an electronic computer which contains a random-access, destructive-readout, non-volatile memory section, the objects, features, and detailed description of operation of the invention will be presented with relationship to its use with this type of electronic device. However, it should be recognized that the teachings of this invention can be incorporated into other electronic devices with the resulting beneficial features and objectives.

Design specifications for electronic devices generally include at least two tolerance limitations. One of these, hereafter referred to as the power source tolerance (PST), specifies an allowable percent variation from a nominal value for the D.C. energy sources thereby restricting the levels of the energy sources. The other, hereafter referred to as circuit operational tolerance (COT), defines the limits between which the dynamic operation of the circuits is reliable. The former is provided to allow the incorporation of a power supply not requiring a high degree of regulation. As an example, if ±5% PST is specified a +15 v. D.C. power supply need only be regulated to maintain the potential between the levels of +14.25 volts and +15.75 volts; a —15 v. supply need only be regulated to stay in the range of —14.25 to —15.75 volts; and a —4.5 v. power supply need only be regulated to stay in the range of —4.27 to —4.75 volts. The COT is generally specified in terms of an allowable percent variation of the energy sources from a nominal value. For example, a COT of ±10% for circuits powered by D.C. energy sources of +15, —15, and —4.5 volts specifies that the dynamic operation of the circuit is reliable even though any or all of the D.C. potentials may vary 10% from their nominal values. The COT encompassing the PST provides what is referred to as an end-of-life specification for the circuits. In other words, by designing these circuits to be operable over the range specified by the COT, the life expectancy of the circuit is considerably enhanced. There is, of course, a correlation between the dynamic signal response capability of the circuits and the level of the energy sources which power these circuits. In a given circuit, for example that shown in FIG. 2, the D.C. potential sources +15 v., —15 v. and —4.5 v. along with the circuit components determine what may be considered the static operational characteristics of the circuit. The term static, in the sense used, is not intended to imply that it is absolutely fixed since obviously it is variable to a certain degree over the tolerance range, but for any given potential within that range the operation is static. The dynamic operational characteristics are likewise determined by the circuit components and the potentials applied to the circuit but refer to the capability of the circuits to respond to signals applied thereto. As an example, a transistorized switching circuit such as shown in FIG. 2 having a specified COT of ±10%, will in general have further design specification limiting the rise, fall, and storage times of the circuit. This characterizes the circuits dynamic response to an input pulse signal of predetermined magnitude and pulse width. The circuit must respond to the input pulse within these latter design specifications as long as the D.C. energizing sources remain within 10% of their nominal values. Any circuit unable to meet this requirement is considered incapable of meeting the end-of-life requirements. It can then be seen that electronic devices incorporating circuits designed in accordance with the general specifications briefly described above, which is accepted good design practice for achieving reliability, will be dynamically operable even though the D.C. energizing sources vary beyond their specified tolerance levels. It is an object of this invention to take advantage of this feature of electronic devices by providing monitoring electronic circuitry for sensing when the D.C. energizing sources have exceeded a predetermined level and for initiating dynamic operations of a protective nature within the electronic device.

It is a further object of this invention to provide the immediately foregoing object with electronic circuits which are powered by the same D.C. energy sources which are monitored.

Yet another object of this invention is to provide electronic circuitry for monitoring the D.C. energizing sources of an electronic device for initiating protective measures when the energizing sources decay to a predetermined level and for maintaining this protection even while the energy sources decay to zero level.

Yet another object of this invention is to provide electronic circuitry for monitoring the D.C. energy supplies in an electronic device for sensing when the levels thereof are approaching limits beyond which the circuits being supplied are inoperable and initiating protective measures utilizing some of the same circuits before the energizing sources reach said inoperable levels.

Still a further object of this invention is to provide the immediately foregoing object and to maintain these protective measures even while the level of the energizing sources exceed the inoperable limits.

Another object of this invention is to achieve the foregoing objects with circuits powered by the same D.C. energizing sources being monitored.

The preferred embodiment of this invention includes, for each of the D.C. energy sources being monitored, a voltage divider network, a trigger circuit, and an output circuit. The voltage divider network is across the energy source being monitored, at least in part, and the trigger and output circuits are powered by D.C. energy sources which are also being monitored. A signal input terminal of the trigger circuit is connected to the voltage divider and the switching threshold for the trigger circuit is preset so that when the energy source being monitored reaches a predetermined level, the potential on the input terminal will cause the trigger circuit to trigger. The output circuit which is normally in the nonconducting condition, has a signal input terminal connected to the signal output terminal of the trigger circuit. Upon triggering of the latter the former is switched to the conducting condition thereby providing a signal ouput to initiate dynamic operation of additional circuits for protection of the electronic device. Preferably, the latter signal output grounds a signal output line so as to disable certain operations within the electronic device. The circuits described above are combined in a manner such that the protecting actions are initiated and maintained regardless of the combination in which the energy sources may decay in level. For example, if three D.C. energy sources are being monitored and the three decay concurrently in any combination at any rate, the monitoring circuits will still be effective to initiate and maintain the protective actions. In a more specific embodiment of this invention, the monitoring circuit is incorporated into an electronic computing device having a random-access, destructive-readout, non-volatile memory section to disable any reference to the memory section when the energy sources are decaying and thereby protect against erroneous disturbance or loss of the stored information.

These and other more detailed objects and features will be disclosed in the course of the following specification, reference being had to the accompanying drawings, in which.

Figure 3A:
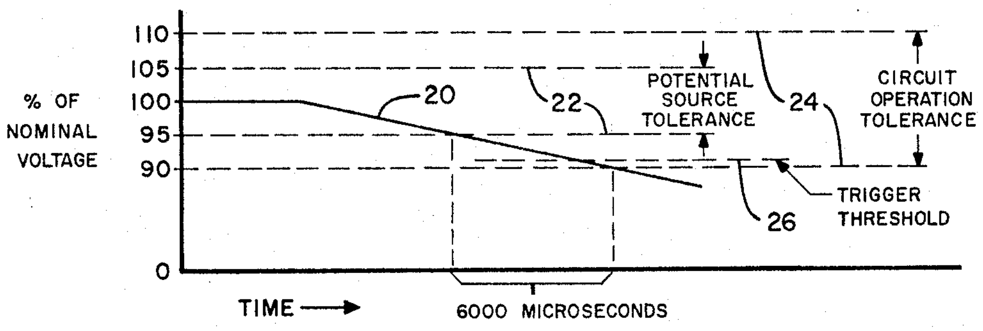
Figure 3B:
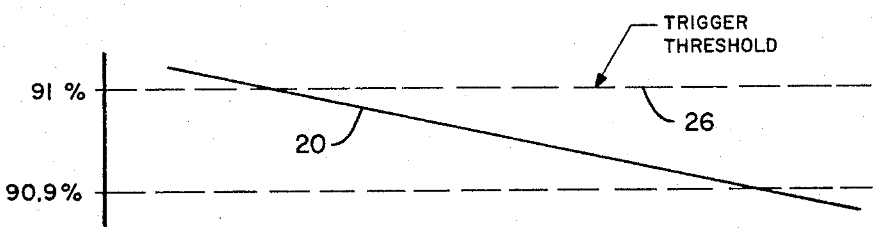
Figure 3C:
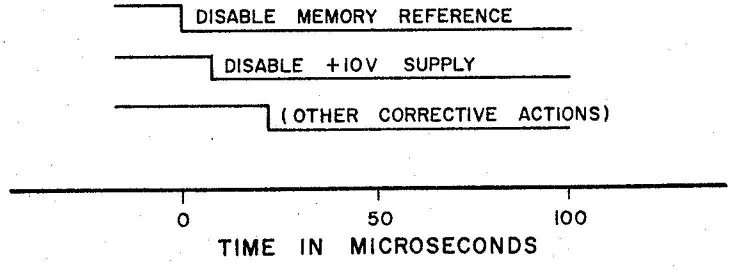
Figure 5:
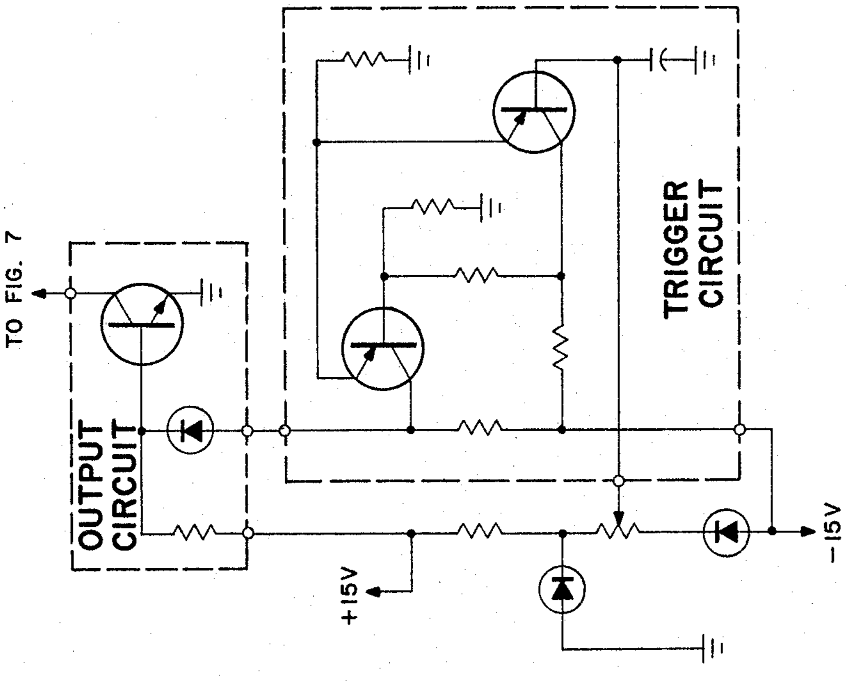
Figure 4:
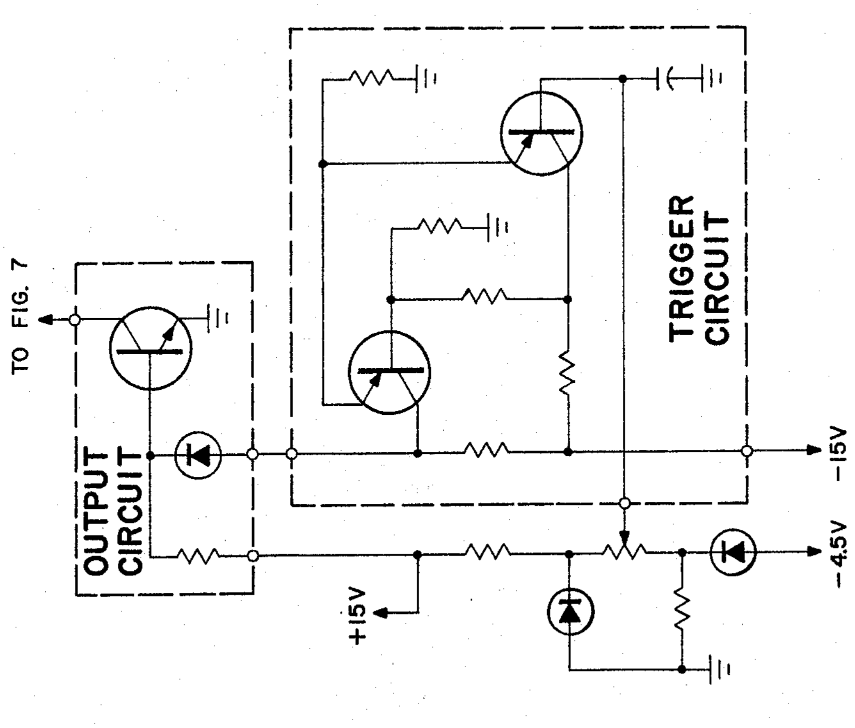
Figure 7:
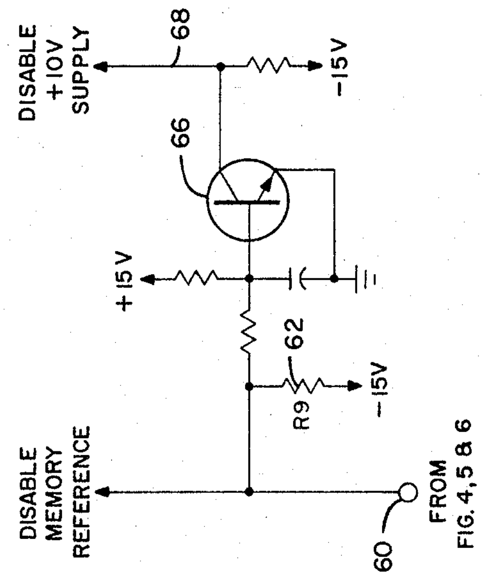
Figure 6:
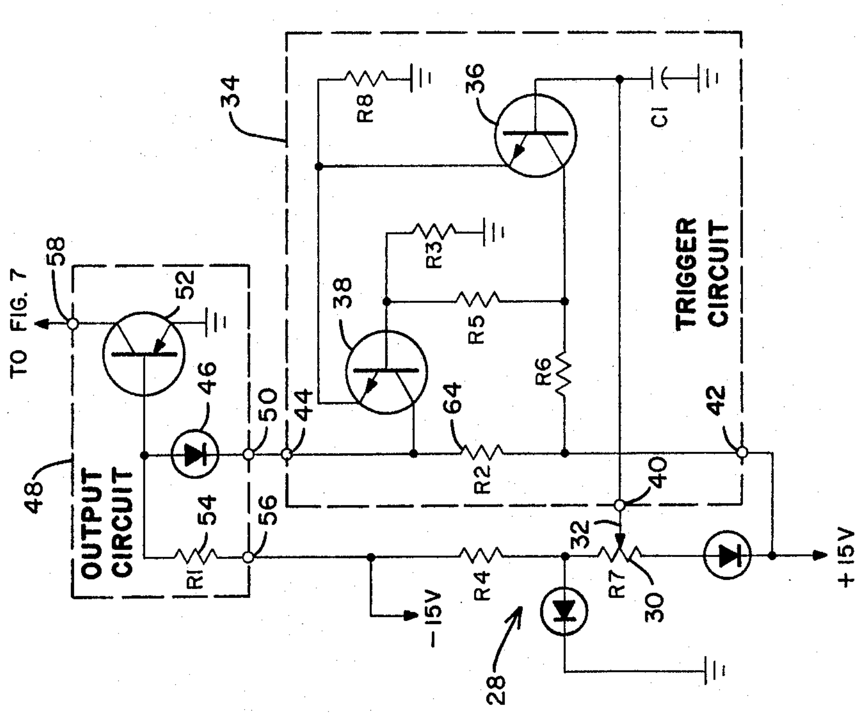

FIGS. 3*a*, 3*b* and 3*c* indicate relative time relationships between decay of energy levels and dynamic signal response of the circuits;

FIGS. 4, 5 and 6 are schematic diagrams of the circuits in the preferred embodiment of the invention;

FIG. 7 is a schematic diagram of a circuit included in a further embodiment of the invention.

Figure 1:
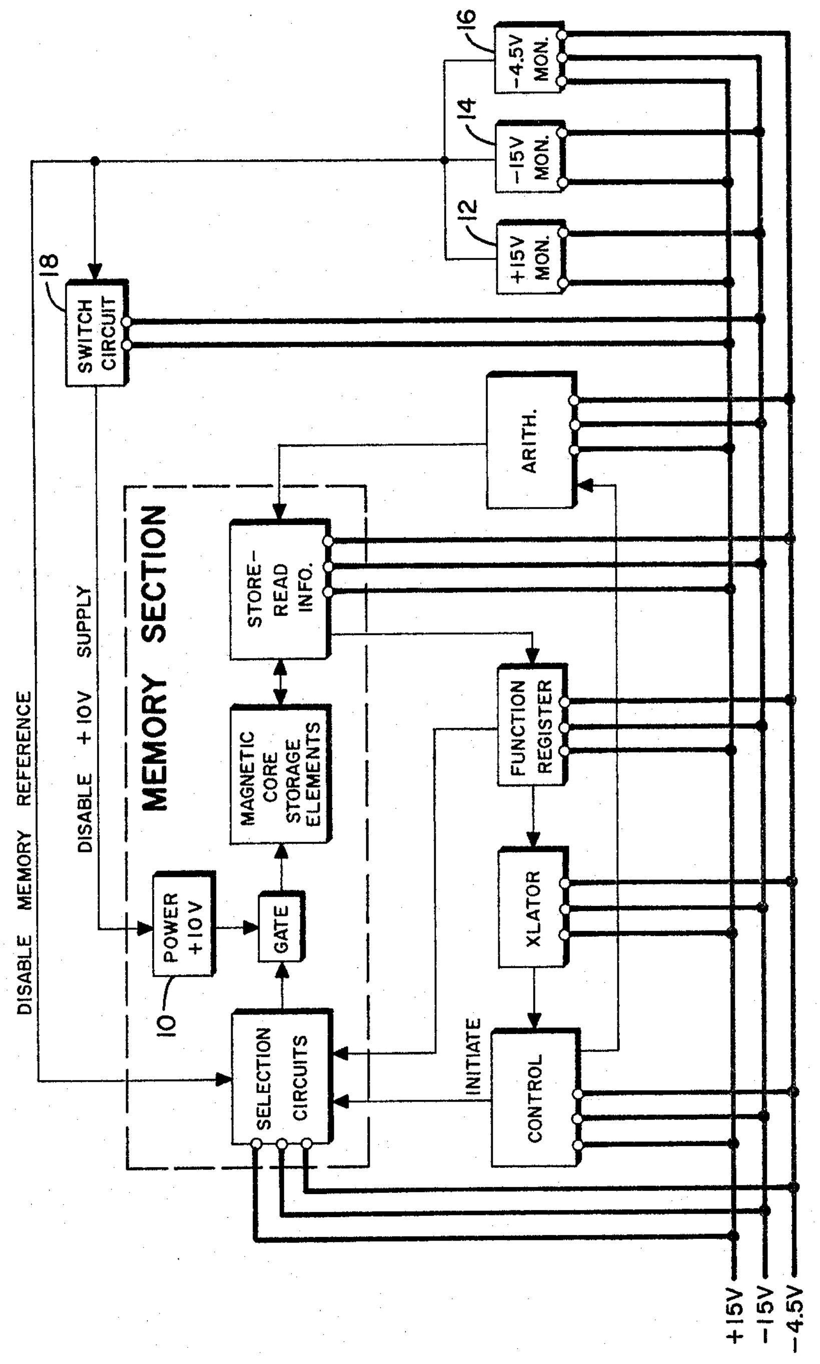
FIG. 1 is a general block diagram of an electronic computer incorporating an embodiment of this invention.
Figure 2:
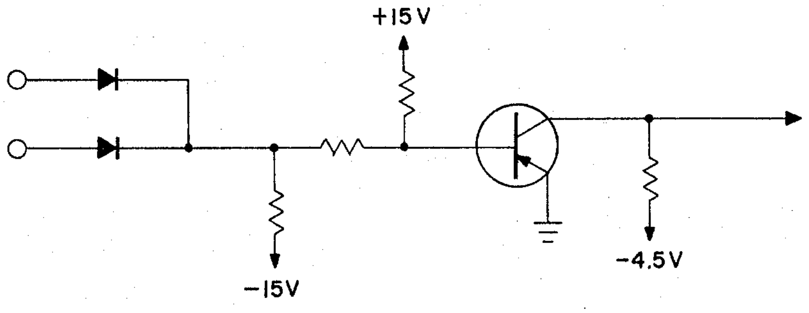
FIG. 2 is a schematic of a typical logic circuit for the computer of FIG. 1.

As previously stated the preferred embodiment of this invention will be described in detail in association with an electronic computing device which contains a random-access, destructive-readout, non-volatile type of memory section. FIG. 1 illustrates, in a general way, this type of electronic computer. The power supply connections are shown in heavy lines to distinguish them from the signal lines. The illustration in FIG. 1 includes some of the essential sections of an electronic computer and the signal connections therebetween. Each of the sections are shown only in block form since their internal operations are not considered a part of this invention. Briefly, in the operation of the computer program instruction words and operands are initially stored in the memory section storage elements and subsequently the program instruction words are read out of the memory in program sequence and transferred to the function register. These instruction words are translated and the results of the translation causes control signals to be generated by the control section at machine cycle rates. Depending on the function called for by the particular instruction word, control may initiate a memory reference by activating a part of the memory section selection circuits to cause information to be read out of or stored into the storage elements at address locations designated by the function register contents. The arithmetic section is connected to the memory section so that information may be transmitted therebetween and arithmetic operations are initiated by signals from the control section. The memory section contains its own +10 v. power supply, 10, which has a high degree of regulation. Power therefrom, in the form of current pulses, is applied to the storage elements through a gate circuit selected by the selection circuits. In the well known manner, a memory reference cyce includes two operations, one for reading out the information stored and the other for restoring this information. Each of the sections shown generally include a plurality of interconnected logic circuits such as the transistorized AND-inverter circuit of FIG. 2. The illustrative circuit of FIG. 2 is powered by D.C. potential sources of +15 v., −15 v. and −4.5 v. The circuits have dynamic response capabilities for responding to and transmitting signals at a rate corresponding to the basic machine cycle rate, which may be in the order of one megacycle. As is common practice, the D.C. potential sources are designed to a power source tolerance (PST), for example ±5% of nominal, and the logic circuits are designed to a circuit operational tolerance (COT) of a wider range, for example ±10% of the nominal value of the D.C. potential sources. The power connections from the +15 v., −15 v. and −4.5 v. supplies to each of the sections of the computing device are included in FIG. 1 to show that the logic circuits obtain the D.C. energy from common sources. It can be seen that if for some reason the energy level of one of the potential sources should decay to a level outside the limit of the COT, for example if the +15 volt source should drop below +13.5 volts, the logic circuits are then in an area of unreliable operation. Under this condition, if a memory reference cycle were initiated, a logic circuit in the selection circuits of the memory section could completely fail or be partially inoperative so as to cause an erroneous operation within the memory section of a nature which would likely destroy at least some of the stored information. This is a constant fear of machine operators since it requires a complete reloading of the information which had been previously stored in order to ensure that it is accurate. This is a time consuming effort. The three monitor circuits, respectively designated 12, 14 and 16, one for each of the D.C. potential supplies, +15 v., −15 v. and −4.5 v. are incorporated to prevent the undesirable loss of the memory information. Each of the monitor circuits receives an input from a respectively different one of the three power busses and further receives D.C. power from two of the D.C. power busses, namely the +15 v. and −15 v. busses. The signal output leads from each of the monitor circuits are connected together and provide an input to the selection circuits of the memory section for disabling the memory reference and provide an input to switch circuit 18 for disabling the +10 volt power supply in the memory section. The action of the monitoring circuits, as will be subsequently described in detail, is such that if any of the D.C. potential sources should decay to a predetermined level the resulting signal outputs disable the memory section to prevent any further memory references and thereby protect the previously stored contents of the storage elements.

FIG. 3 illustrates the relationship, in a typical case, of the decay time of the potential source to the dynamic signal response of the circuits. As shown in FIG. 3*a*, initially the D.C. potential source is at its nominal value. Due to some event, such as a failure in the supply or turning off of the supply, the potential level decays. The rate of decay is illustrated at 20 as being linear but this need not be and in general is not the case. Furthermore it can be expected that there would be noise signals superimposed on the D.C. potential source level but for purposes of clarity these are not shown. A first pair of horizontal dashed lines, 22, designate the upper and lower limits of the ±5% PST and a further pair of horizontal dashed lines, 24, designate the upper and lower limits of the ±10% COT. As the level of the potential source decays it passes through the 95% level toward the lower limit of the COT at the 90% level. As previously stated any corrective action must be initiated prior to the potential source reaching said latter level so that the circuits involved may be dynamically operable while still in the reliable area. In a typical case, as shown in FIG. 3*a*, the D.C. potential source may decay 5% from the 95% level to the 90% level in a period of time in the order of 6,000 microseconds. At a predetermined level, designated the trigger threshold and indicated by dashed line 26, the corrective action is initiated. The area surrounding that portion of FIG. 3*a* where the potential level crosses the trigger threshold and decays towards the lower limit of the COT, is shown in an expanded scale in FIG. 3*b*. FIG. 3*c* in included to illustrate that the dynamic response capabilities of the circuits are such that they can respond to signals for initiating corrective action in a short period of time relative to the decay rate of the potential source. For example, corresponding to the time at which the potential source has decayed to 91% of its nominal value, the threshold level designated 26, a signal for disabling the memory reference is initiated. A further signal for disabling the +10 v. supply is generated in the order of 10 microseconds later. Additional corrective action signals are indicated as occurring in the order of 10 to 20 microseconds later. In other words, from the relative time scales in FIG. 3, it can be seen that during the period of time that the potential source decays only a small amount, e.g. in the order of 1/10 of 1%, the dynamic signal response capabilities of the circuits are such that they can generate and respond to signals rapid enough to implement corrective action prior to the potential source level decaying to the COT minimum level. It should be understood that the specified time rates are only illustrative and are only intended to set the invention in a proper perspective by illustrating relationship of the decay rates to the dynamic signal response capabilities. It should also be recognized that it is not within contemplation of this invention to control the decay rate of the D.C. potential sources. The invention is directed toward use in electronic devices in which these relative rates are inherent in the design.

The circuit schematics of the monitor circuits 16, 14 and 12 of FIG. 1 are shown respectively in FIGS. 4, 5 and 6. Since the circuits are substantially similar only a detailed description of operation of the circuit of FIG. 6 will be described and from that the operation of the circuits of FIGS. 4 and 5 will be apparent. Referring now to the +15 v. monitor circuit in FIG. 6, there is shown a voltage divider network 28 including a pair of fixed resistances and a pair of Zener diodes connected between the −15 v. and +15 v. sources. In the voltage divider network the resistance value of resistor 30 is fixed but it has a variable tap 32. The trigger circuit 34, enclosed by dashed line, is the well known Schmitt trigger including a pair of NPN transistors 36 and 38. The base of transistor 36 is connected to the variable tap 32 through the signal input terminal 40. D.C. energy for the trigger circuit is supplied by the +15 v. source through power input terminal 42. The collector element of transistor 38 is connected to the signal output terminal 44. The latter is connected to one electrode of Zener diode 46 in output circuit 48 through the output circuit signal input terminal 50. The other electrode of Zener diode 46 is connected to the base of PNP transistor 52 which is connected in the grounded emitter configuration. The base element is also coupled to the −15 v. source through resistor 54 and power input terminal 56. The collector of transistor 52 is connected to the signal output terminal 58 of the output circuit. As indicated in FIGS. 4, 5 and 6, the output circuit output terminals are connected together at the terminal labelled 60 in FIG. 7. The −15 v. supply provides the D.C. energy for the collector circuits of all three of the output circuits through resistor 62. Connected together in this manner there is effected an OR circuit so that if any of the transistors in the respective output circuits is in the conducting state, terminal 60 is essentially at ground potential.

The circuit operates in the following manner. The variable tap 32 is poistioned such that as long as the +15 v. source being monitored is above a predetermined level, the potential applied from the voltage divider network 28 to the base of transistor 36 in the Schmitt trigger will be of a value that the latter will be in a relatively high conduction state and transistor 38 will be in a relatively low conduction state. With negligible current flowing in the collector circuit of transistor 38, the potential at the signal output terminal 44, as applied to the signal input terminal 50 of the output circuit 48, will be at a fairly high positive level approaching the +15 v. The potential applied across Zener diode 46 from the −15 v. source connected to the power input terminal 56 of output circuit 48 will be sufficient to exceed the threshold firing potential of the Zener diode so that it will be in the high conducting state. The component values, including that of resistor 54 and the substantially constant voltage drop across Zener diode 46 when fired, are chosen such that in this condition a positive potential appears at the base of PNP transistor 52 maintaining it in the cutoff condition. In this manner the signal output terminal 58 of the output circuit 48 and terminal 60 in FIG. 7 are at some negative potential level. When the +15 v. source decays to the predetermined level, i.e. the trigger threshold, approaching the lower limit of the COT, the signal level from the variable tap 32 applied to the base of transistor 36 via terminal 40 will initiate a change in the latter transistor to a relatively low conduction level. The rapid switchover action inherent in the Schmitt trigger circuit causes a rapid change of transistor 36 to a relatively low conduction level and transistor 38 to a relatively high degree of conduction. The increased current through resistor 64 resulting from the increased collector current in transistor 38 effects sufficient drop from the +15 v. source such that the potential across Zener diode 46 decreases to a level below that required to maintain conduction. The negative potential appearing on the base of transistor 52 from the −15 v. source through resistor 54 causes the latter transistor to switch to the high conduction state thereby placing the signal output terminal 58 and terminal 60 essentially at ground potential. The selective switching of terminal 60 from some negative potential to ground is then used to control the selection circuits of the memory section of the computer device illustrated in FIG. 1. Preferably this is done by any well known gating system in which the presence of a negative potential on terminal 60 will enable the gates to maintain the memory selection circuits operable whereas when the terminal 60 is switched to the ground potential the gates are disabled thereby disabling the selection circuits. This selective switching of the potential on terminal 60 can be used in a similar manner to control the operation of other circuits or to provide a signal to initiate selected operations. Except for the polarities of the energizing potentials, component values and transistor types, all three of the monitor circuits operate in a similar manner as described above with reference to FIG. 6, to selectively switch terminal 60 of FIG. 7 between some negative potential level and ground, with the latter effecting the disabling of the memory reference.

There will now be described how the unique combination of circuits in this invention provide the stated features and objectives. Considering first the monitoring circuit for the +15 v. source shown in FIG. 6, it should be noted that the source being monitored also provides the D.C. energy for the trigger circuit 34. When the +15 v. source decays to the trigger threshold the circuit operation, as described above, provides a signal output from terminal 58 to disable the memory selection circuits. After a further period of time the continuing decay of the +15 v. source causes it to exceed the lower limit of the COT and since the trigger circuit is receiving its D.C. energy from the same source, it will then be in the area of unreliable operation. However, since the effect of triggering the trigger circuit had been to substantially cutoff the conduction of Zener diode 46 in the output circuit 48, the trigger circuit will thereafter no longer effect the operation of the output circuit. Even though the trigger circuit thereafter operates in an unreliable and unstable manner, it will not affect the disabling of the memory reference circuits.

Considering now the monitoring circuit for the −15 v. source shown in FIG. 5, the trigger circuit is in a like manner energized by the same source being monitored. The action of the trigger circuit is such as to substantially cut off the conduction of the Zener diode in the associated output circuit when the trigger circuit threshold is reached. This provides the disabling signal from the signal output terminal of the output circuit and subsequent unreliable operation of the trigger circuit will no longer affect the operation of the output circuit. However, in the −15 v. monitor, it should be noted that the collector potential for the output circuit transistor is −15 v. via resistor 62, as shown in FIG. 7. The decay of the −15 v. potential will not adversely affect the operation of the output circuit since as the −15 v. decays it only means that the +15 volt source, which provides the base drive current, need only supply sufficient current to the base to maintain the collector at ground level. Therefore the required base drive current from the +15 v. source will decrease as the level of the −15 v. source decays. In the case of the monitor for the −4.5 v. source, shown in FIG. 4, since the +15 v. and −15 v. sources are utilized for providing the energy to operate the circuits, there is no concern with the circuits reaching an unreliable operating condition due to decay of the energy supplying sources.

Considering now the combination of two of the energy sources, for example both the +15 v. and the −15 v., decaying concurrently. It will be assumed that they either decay at different rates or that one starts decay subsequent to the other so that one of them reaches the trigger threshold prior to the other. Assuming the −15 v. source reaches the trigger threshold first, its monitor circuit will generate the disable memory reference signal. Even though the +15 v. is likewise decaying it will always be of sufficient magnitude to provide enough base drive current for the transistor in the output circuit since the −15 v. collector supply is decaying. If the +15 v. should reach the trigger threshold first its corresponding trigger circuit will initiate the disable memory reference signal. Even though the −15 v. is also decaying, the disabling signal will be maintained by the output circuit since both the collector and the base are supplied by the −15 v. source.

Of further interest in the operation of the invention is that during the period of time in which the levels of the energy sources are rising toward their nominal level, for example when power is first applied to the circuits, the same effective control is provided. As long as the monitored energy source is below the trigger threshold the disabling signal is maintained. The hysteresis effect inherent in the Schmitt trigger circuit is such as to ensure that the monitored potential sources rise above the trigger thresholds before the disabling signal is removed.

For illustrative purposes, typical component values for the circuit of FIG. 6 are listed below:

| | |
|---|---|
| $R1$=15,000 ohms | $R6$=4,700 ohms |
| $R2$=3,900 ohms | $R7$=1,000 ohms |
| $R3$=680 ohms | $R8$=560 ohms |
| $R4$=160 ohms | $R9$=5,100 ohms |
| $R5$=1,200 ohms | $C1$=.01 microfarad |

Although the disabling signal developed as previously described is utilized to disable the memory selection circuits, it has also been found desirable to prevent the 10 v. power supply in the memory section from providing any erroneous current pulses to the storage elements. This is effected by the switch circuit 18 of FIG. 1 which is shown schematically in FIG. 7. In the normal operating range, the voltage divider network between a +15 v. and −15 v. provides a relatively negative potential to the base of the NPN transistor 66 keeping it in the nonconducting state. The collector then is at a relatively high negative potential level which is applied to the 10 v. power supply 10 via line 68, to maintain the latter in the enable condition. Upon the occurrence of a disable memory reference signal from any of the monitor circuits which place terminal 60 at ground level, the base of transistor 66 is driven to a positive potential causing conduction of the transistor. This places the collector at substantially ground level which results in disabling the 10 v. supply in the memory section.

It is within contemplation of this invention that other corrective actions can be effected in an electronic device of the nature described. Since the logic circuits and others in the computing device are still within their operational tolerance limits for a period of time after the trigger threshold is reached during decay of the energy sources, it is contemplated that some computer program operation may be effected during this period of time. For example, it is contemplated that the memory reference disabling signal can be delayed and a control function initiated which will place a preselected computer instructor word in a predetermined memory address so that upon subsequent reinitiation of the program steps this word may be obtained from the predetermined address to initiate the program in its proper sequence. Since the dynamic signal response of the circuit is of such a rapid rate as compared to the decay rate of the energizing sources, it is obvious that numerous corrective measures may be initiated during the interval of time in which the energy source is decaying between the trigger threshold and the lower limit of the circuit operation tolerance.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. In a data processing system having a plurality of circuit means each characterized by static operation capability according to a quiescent operating point which is determined in part by the energy level of D.C. energy supplies for the circuit means, said quiescent operating point being in a reliable operation range extending between predesignated upper and lower voltage limits, said circuit means further characterized by dynamic operation in response to signal changes applied thereto, a power failure sensing circuit comprising: circuit means for constantly monitoring the levels of the D.C. energy supplies, said circuit means including voltage threshold sensing means having reference voltage isolation means, said thresholds sensing means developing a signal change when any of the respective D.C. energy supplies reaches predetermined levels approaching said limits; control circuit means for activating predetermined operation sequences; and means for applying said developed signal change to said control circuit means to effect preselected dynamic operations thereof in a period of time less than that during which the D.C. energy level reaches one of said limits from said predetermined level.

2. In a power failure sensing circuit: a voltage divider network having first and second terminals for coupling said network serially between first and second D.C. energy sources, the voltage level of one of said sources to be monitored, said network including voltage isolation means for permitting sensing of a reference voltage; a trigger circuit having a stable state of static operation in the absence of an input signal and an active state of operation in response to an input signal and having, a signal input terminal coupled to said voltage divider network for causing said trigger circuit to switch from said stable state of operation to said active state of operation in response to a sensed predetermined variation of the monitored energy source, a power supply input terminal for coupling to said monitored D.C. energy source, and an output signal terminal; and an output circuit having, a signal input terminal connected to the output signal terminal of said trigger circuit, a power supply input terminal for coupling to said second D.C. energy source, and an output signal terminal for providing a signal indicative that the monitored energy source has failed.

3. In a power failure sensing circuit:

a pair of sources to be monitored, each having predetermined nominal voltage values and a predetermined range of permissible voltage deviation; at least one other source of D.C. energy;

a pair of trigger circuits each having a stable state of static operation in the absence of an input signal and an active state of operation in response to an input signal and having, a voltage divider network having first and second terminals for serially coupling said network between an associated one of said D.C. energy sources to be monitored and said other source, said network including voltage isolation means for permitting sensing of a reference voltage;

a signal input terminal coupled to an associated voltage divider network for causing said associated trigger circuit to switch from said stable state of operation to said active state of operation in response to a sensed predetermined variation of said monitored energy source, a power supply input terminal connected to an associated different one of said pair of D.C. energy sources, and a signal output terminal for providing a signal indicative that said trigger circuit has been switched to said active state; an output circuit for each of said trigger circuits each of said output circuits having, a signal input terminal connected to the signal output terminal of an associated one of said trigger circuits, a power supply input terminal connected to said other source of D.C. energy, a control circuit for generating corrective action;

and a means for coupling each of said signal output terminals of said output circuits in common to said control circuit, any of said active output signals capable of initiating operation of said control circuit.

4. In a digital computing machine incorporating circuit means for performing machine control operations at machine cycle time rates, a non-volatile memory section operatively controlled by at least some of said circuit means and D.C. energy sources for supplying energy to said circuit means, energy source monitoring apparatus comprising: means for coupling to a D.C. energy source having a predetermined rate of voltage decay; memory controlling circuit means; circuit means comprising threshold circuit means for monitoring said D.C. energy source and for developing an output pulse signal when the energy level of said source has decayed to a predetermined level approaching a voltage limit level beyond which the circuit means are not reliably operative, the time rate of decay being substantially longer than the machine cycle time rate; and output circuit means coupled intermediate said circuit means and said memory controlling circuit means, said output circuit means responsive to said developed output pulse signal for disabling the operation of said memory controlling circuit means before the energy source decays to said voltage limit level.

5. For protecting the operation of an electronic device electrically powered by D.C. energy sources, a device protection apparatus comprising: a trigger circuit for each of the D.C. energy sources to be monitored, each of said trigger circuits including, a sensing circuit for coupling to an associated one of the energy sources, said sensing circuit including voltage isolation means, a signal input terminal for coupling to an associated one of said sensing circuits for causing the associated one of said trigger circuits to be activated by a sensed predetermined voltage level change, means for setting a triggering threshold at which said trigger circuit will trigger in response to said predetermined voltage level change at said input terminal, a signal output terminal for providing a signal indication when said trigger circuit triggers, and means for receiving electrical power from one of the D.C. energy sources;

an output circuit for each of said trigger circuits each of said output circuits including, a signal input terminal connected to the signal output terminal of a respectively associated one of said trigger circuits for causing said output circuit to provide an activating signal in response to a received signal indication, means for receiving electrical power from one of the D.C. energy sources other than the one powering the respectively associated trigger circuit, and an output signal terminal for providing said activating signal when said output circuit is rendered active by said signal indication; and control means responsively coupled to said output signal terminal of each of said output circuits for controlling initiation of protective action for the electronic device.

6. In computing apparatus, a control circuit for protecting the data stored in a volatile memory comprising: an addressable memory including a memory power supply for supplying power to said memory; at least one monitored source of voltage, said source having predetermined range of permissible upper and lower voltage limits; a trigger circuit having at least as one source of power said monitored source of voltage and having a triggering input terminal and an output terminal for providing a protective signal in response to a triggering signal received at said input terminal; sensing means coupled to said monitored source of voltage and to said input terminal for providing an activating signal to said trigger circuit when said source of voltage varies in relationship to said predetermined upper and lower voltage limits by a predetermined amount; an output circuit responsively coupled to said output terminal, said output circuit having a control terminal for providing a control signal in response to said activating signal; and means for coupling said control terminal to said memory power supply for deactivating said power supply in response to said control signal.

7. Apparatus as in claim 6 wherein said sensing means comprises: a voltage divider network including first means coupled to said monitored voltage source; second means for receiving a second voltage level; a first Zener diode having one terminal coupled to said first means and having a second terminal; a tapped resistor having first and second terminals and an output terminal coupled to said trigger circuit input terminal, said first resistor terminal coupled to said second terminal of said first Zener diode, said tapped resistor capable of adjusting the threshold voltage level at which said activating signal will be supplied to said trigger circuit; a second Zener diode having first and second terminals, said first terminal of said second Zener diode coupled to said second terminal of said tapped resistor, thereby forming a junction, said first and second Zener diodes providing isolation for permitting the reference voltage to be sensed; and resistor means coupled intermediate said junction and said second means, whereby a change in value of the monitored voltage having a predetermined relationship to said predetermined voltage limits causes an activating signal to be provided at said output terminal.

8. In electronic apparatus having a number of D.C. energy sources for providing power to operational circuit, each of the energy sources having a permissible range of voltage variation within which the operational circuit will operate reliably, a power failure sensing circuit for monitoring one of the energy sources comprising: a trigger circuit having at least as one source of power the energy source which is to be monitored, and having a trigger input terminal and an output terminal; sensing means coupled to the energy source which is to be monitored and to said trigger input terminal for providing an activating signal to said trigger circuit when the energy source varies in relationship to the predetermined range by a predetermined voltage shift; said activating signal causing said trigger circuit voltage variation to provide a protective signal to said output terminal; and output circuit means coupled to said output terminal for activating protective action in response to said protective signal.

9. Apparatus as in claim 8 wherein said sensing means includes isolation means for establishing monitored voltage isolation for permitting the monitored voltage to be accurately sensed.

10. Apparatus as in claim 9 wherein said isolation means includes a pair of Zener diodes and a resistor element serially coupled intermediate said Zener diodes, one of said Zener diodes having a terminal for coupling to the energy source which is to be monitored, said Zener diodes establishing a range of reference voltage for said trigger circuit.

11. In computing apparatus, power failure sensing circuits comprising: at least two energy sources for providing power to circuits, each of said energy sources having a predetermined range of voltage variation within which said circuits will operate reliably; a separate power failure sensing circuit responsively coupled respectively to each of said energy sources to be monitored, each of said sensing circuits having an output terminal for providing an activating signal when the associated monitored one of said energy sources decays to a predetermined voltage level; a separate trigger circuit having an input terminal responsively coupled to said output terminal of an associated one of said sensing circuits, each of trigger circuits having an output terminal for providing a control signal when an activating signal is received at said input terminal, said trigger circuits having at least said monitored energy sources as sources of operational power; and control means coupled to said output terminals of said trigger circuits for providing an activating signal in response to any of said control signals, said activating signal for initiating protective action in response to a sensed loss of power from any one of said monitored energy sources.

12. Apparatus as in claim 11 wherein each of said power failure sensing circuits includes isolation means for establishing monitored voltage isolation for permitting the monitored voltage to be accurately sensed.

13. Apparatus as in claim 12 wherein said isolation means includes a pair of Zener diodes and a resistor element serially coupled intermediate said Zener diodes, said one of said Zener diodes having a terminal coupled to the energy source which is to be monitored, said Zener diodes establishing a range of reference voltage for said trigger circuit.

14. Electronic apparatus energized from direct current sources which apparatus contains circuits and components which operate reliably within predetermined upper and lower level voltage limits of the energy supplies, and protective circuits which continuously monitor the voltage levels of the various energy sources and which generate a signal whenever the voltage level of an energy source has varied to a predetermined value within the limits, said signal acting to bring about predetermined operations within a period of time less than that during which the source reaches one of the limits from said predetermined value and wherein said protective circuits comprise a trigger having a signal input terminal connected to a voltage divider, said voltage divider being connected across first and second D.C. energy sources to set a threshold potential at which said trigger will change states in response to a predetermined potential level on said input terminal, a power supply input terminal connected to one of the D.C. energy sources and a trigger output terminal; and an output circuit having an input terminal connected to the trigger output terminal, a power supply input terminal connected to the D.C. energy source other than that providing power to the trigger and an output signal terminal, the output signal terminals for the protective circuits being coupled together.

15. Electronic apparatus as claimed in claim 14 wherein said protective circuits change their states in response to a decaying voltage level of their respective energy sources.

References Cited by the Examiner

UNITED STATES PATENTS

| | | | |
|---|---|---|---|
| 3,077,551 | 2/1963 | Nelson et al. | 317—148.5 |
| 3,151,256 | 9/1964 | Simon e al. | |
| 3,164,727 | 1/1965 | Heyda. | |

OTHER REFERENCES

G.E. Transistor Manual, 5th edition, p. 122.

MILTON O. HIRSHFIELD, *Primary Examiner.*

SAMUEL BERNSTEIN, *Examiner.*

R. V. LUPO, *Assistant Examiner.*